United States Patent
Huber et al.

(10) Patent No.: US 7,472,867 B2
(45) Date of Patent: Jan. 6, 2009

(54) SUPPORT ROLLER ARRANGEMENT FOR USE IN AN AIRCRAFT CARGO HOLD

(75) Inventors: Thomas Huber, Schliersee (DE); Richard Holzner, Rosenheim (DE)

(73) Assignee: Telair International GmbH, Miesbach (DE)

( * ) Notice: Subject to any disclaimer, the term of this patent is extended or adjusted under 35 U.S.C. 154(b) by 160 days.

(21) Appl. No.: 11/082,091

(22) Filed: Mar. 16, 2005

(65) Prior Publication Data

US 2005/0224644 A1   Oct. 13, 2005

(30) Foreign Application Priority Data

Mar. 22, 2004   (DE)   ................ 10 2004 013 909
Mar. 25, 2004   (DE)   ................ 10 2004 014 745

(51) Int. Cl.
   *B64C 1/20*   (2006.01)
(52) U.S. Cl. .............. 244/118.1; 410/92; 244/137.1
(58) Field of Classification Search ............. 244/118.1, 244/137.1, 137.3; 410/92, 77, 79; 198/370.09, 198/37, 835, 838; 384/418; 248/500, 503
See application file for complete search history.

(56) References Cited

U.S. PATENT DOCUMENTS

| | | | | |
|---|---|---|---|---|
| 3,381,921 A | * | 5/1968 | McDonough et al. | 410/79 |
| 4,077,590 A | * | 3/1978 | Shorey | 410/77 |
| 4,395,172 A | * | 7/1983 | Hoener et al. | 410/84 |
| 4,462,493 A | * | 7/1984 | Nordstrom | 193/35 R |
| 4,696,609 A | * | 9/1987 | Cole | 410/69 |
| 4,699,337 A | * | 10/1987 | Lewis | 244/137.1 |
| 4,852,718 A | * | 8/1989 | Kunstmann | 198/465.3 |
| 4,949,837 A | * | 8/1990 | Huber | 198/782 |
| 6,051,133 A | * | 4/2000 | Huber et al. | 210/171 |
| 6,168,011 B1 | * | 1/2001 | Morsbach | 198/779 |
| 6,413,029 B1 | * | 7/2002 | Kernkamp | 410/79 |
| 6,443,293 B2 | * | 9/2002 | Patrito | 198/465.1 |

FOREIGN PATENT DOCUMENTS

DE   29 08 400   9/1980

* cited by examiner

*Primary Examiner*—Bret Hayes
*Assistant Examiner*—Benjamin P Lee
(74) *Attorney, Agent, or Firm*—Baker & Hostetler LLP

(57) ABSTRACT

Conventional support rollers are installed on the floor of an aircraft cargo hold in a mounting profile that comprises side walls, and in an interior space of the mounting profile latch elements can be mounted in order to secure containers, pallets or similar items of freight. To reduce the construction expense, the weight, and the work of assembly, it is proposed that two external rollers be rotatably mounted, outside the interior space of the mounting profile, on an axle that passes through the side walls of the mounting profile.

24 Claims, 3 Drawing Sheets

SUPPORT ROLLER ARRANGEMENT FOR USE IN AN AIRCRAFT CARGO HOLD

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a support roller arrangement mounted in a mounting profile for use in a floor of an aircraft cargo hold.

BACKGROUND OF THE INVENTION

Patent DE 2908400 A1 discloses an arrangement for a cargo-hold floor of a large scale aircraft, in which a total of six rows of mounting profiles are installed in the long direction of the aircraft. In these mounting profiles both support rollers and locking elements are seated. The arrangement of the mounting profiles is such that there is room for two containers side by side, with their edges as well as middle regions seated on the support rollers. To keep the containers from moving in a direction transverse to the long axis of the aircraft, suitably oriented latch elements are provided between the middle mounting profiles.

In this arrangement it is considered disadvantageous that the support rollers in each of the mounting profiles are used for only one row, in the long direction of the aircraft, of containers or pallets; for the next row of containers, pallets or similar items of freight a separate mounting profile with support rollers seated therein is needed.

BRIEF SUMMARY OF THE INVENTION

It is an object of the present invention to provide a support roller arrangement which can be used in more diverse ways than conventional arrangements while requiring little effort and expense to construct.

According to the present invention there is provided a support roller arrangement mounted in a mounting profile for use in a floor of an aircraft cargo hold, the mounting profile comprising side walls and defining an interior space wherein latch elements can be mounted in order to secure an item of freight, the arrangement comprising an axle that passes through the side walls of the mounting profile and on each end of which an external roller is rotatably mounted outside the interior space of the mounting profile.

This arrangement makes it possible to mount two rows of support rollers in the long direction of the aircraft using a single mounting profile.

Preferably, an internal roller in addition to the external rollers is mounted on the axle in the interior space of the mounting profile. This internal roller provides an improved support for the container when it travels not only with its marginal zone resting on one of the two external rollers, but rather with its entire floor resting on both external rollers and the internal roller.

Preferably also, each of the external rollers is mounted in a support cage, which is attached on one side to the associated side wall of the mounting profile and on the other side comprises an outer wall in which the axle is fixed and supported by way of an end section. Even though only slightly more work is required to install the external rollers, the result is a considerably increased stability of the whole arrangement, while the support profile can be kept substantially free from bending forces.

The support cage preferably comprises an upper surface with a central aperture through which the external roller projects. The result is improved protection of the arrangement as a whole from damage.

The upper surface is preferably constructed so that it slopes upward towards the external roller, so that when a container approaches, it is guaranteed to travel onto the roller. Furthermore, the upper surface of the cage preferably has a rounded outer contour with side flanks that diverge in the direction towards the associated side wall of the mounting profile. One advantage of this feature is increased stability of the arrangement as a whole, and another is that the freight is also better protected against becoming caught up against the cage.

The external rollers are preferably considerably narrower than the interior space of the mounting profile or an internal roller that might be mounted there. As a result, on one hand stability is increased because of the shorter axle while on the other hand, despite this shortening, a container being transported over only one external roller is not overstressed because the part of the container in contact with the external roller is its edge, a region in which the customary containers or pallets are reinforced.

In a preferred embodiment of the invention, the support roller arrangement is installed, in particular individually, in the middle of a cargo-hold floor of an aircraft to operate as a roller conveyor, the mounting profile is provided with cross-latches so that pairs of containers or pallets or similar items of freight can be locked together along the middle of the cargo-hold floor. When the roller is utilized in this way, one mounting profile can be eliminated, which is especially advantageous not only with respect to the effort of assembly but in particular with respect to the savings in weight.

Preferred embodiments of the invention will be now described by way of example with reference to the accompanying drawings.

DETAILED DESCRIPTION OF THE INVENTION

Figure 2:
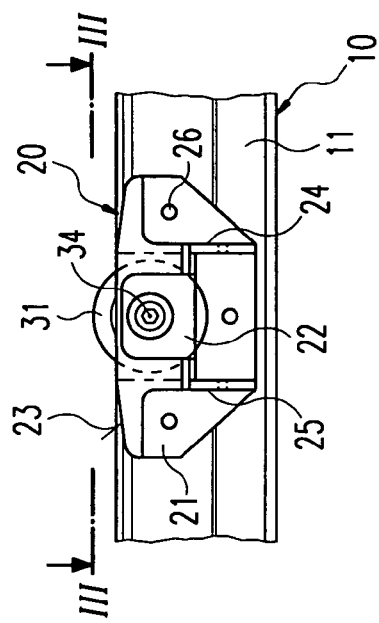
FIG. 2 is a view along the line II-II in FIG. 1.

In the following description, the same reference numerals are used for identical parts or parts with identical actions.

As shown in FIGS. 1 to 4, a mounting profile 10 comprises side walls 11 and 12 that project upward from a floor 13. The upper edges 14 and 15 of the side walls 11 and 12 are "flanged" outward to increase the resistance to bending.

At the side walls 11, 12, and specifically at their outer surfaces, cages 20 are mounted by way of a flange 21 that is attached to the side walls 11, 12 by means of rivets 26. The cage 20 further comprises lateral panels 24, 25 that extend outward from the flange 21 in a direction perpendicular to the side walls 11, 12 of the mounting profile 10, as well as an outer wall 22 that connects these lateral panels 24, 25, so that a closed box resistant to bending is produced. The upper edges of the outer wall 22 and the lateral panels 24, 25 merge with an upper surface 23 from which a section has been cut out to leave an opening 27. This upper surface 23 is, on one hand, shaped so that it slopes upward toward the middle of the cage (see FIG. 2), while on the other hand it comprises a circumferential edge that converges toward the outside, away from the mounting profile 10, and is rounded at its corners.

An axle 32 passes through the side walls 11, 12, the flange 21 and the outer walls 22 of the two cages 20, which are disposed exactly opposite one another, and is kept in place by spring rings or similar devices situated at its ends. On the axle 34 are rotatably disposed external rollers 31 and 32 as well as one internal roller 33; the diameters of the external rollers 31, 32 and the internal roller 33 are identical, and the external rollers 31, 32 extend upward through the openings 27 in the cages 20.

Figure 4:
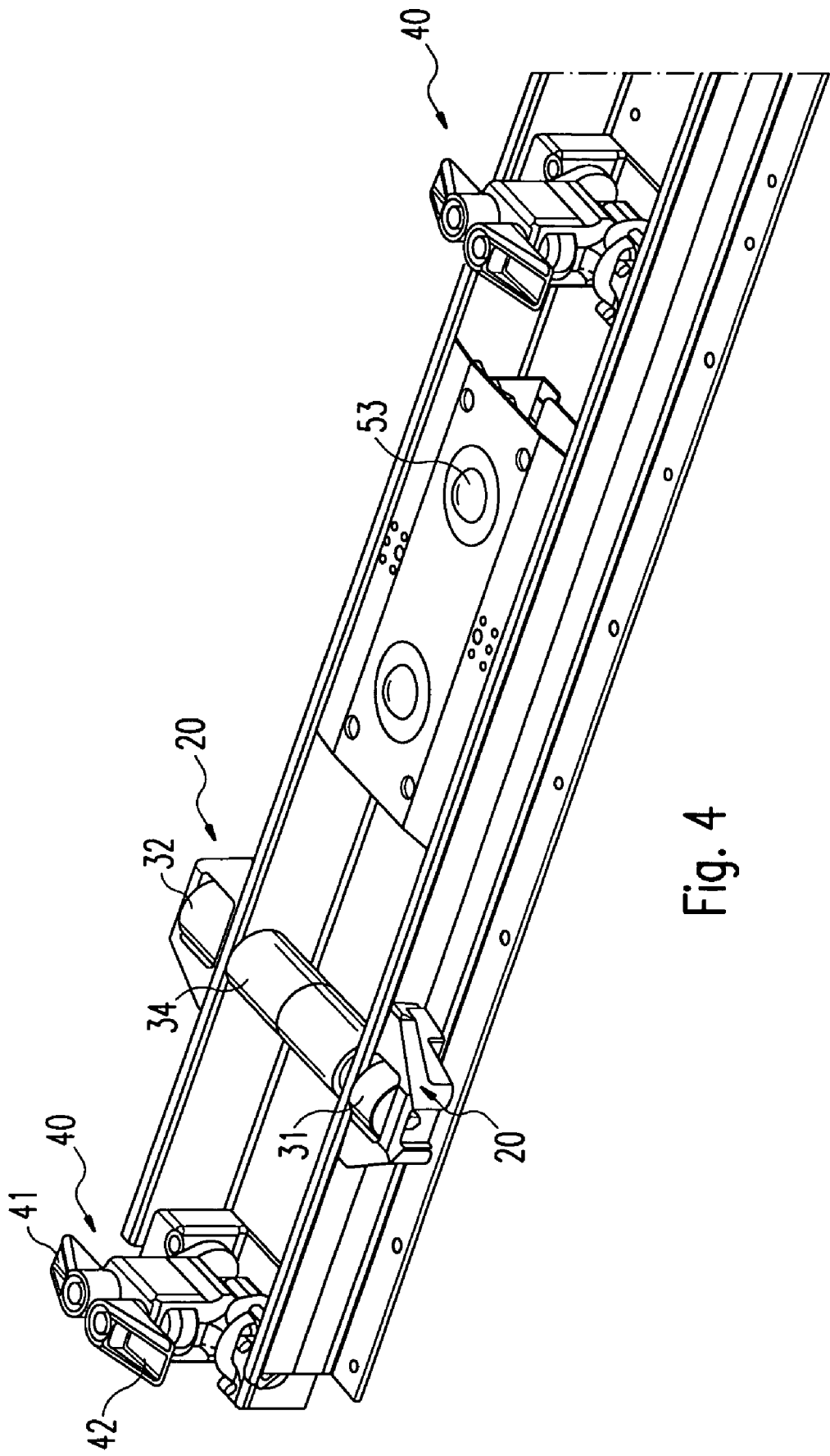
FIG. 4 is a perspective view of a mounting profile with support rollers and latches.
Figure 5:
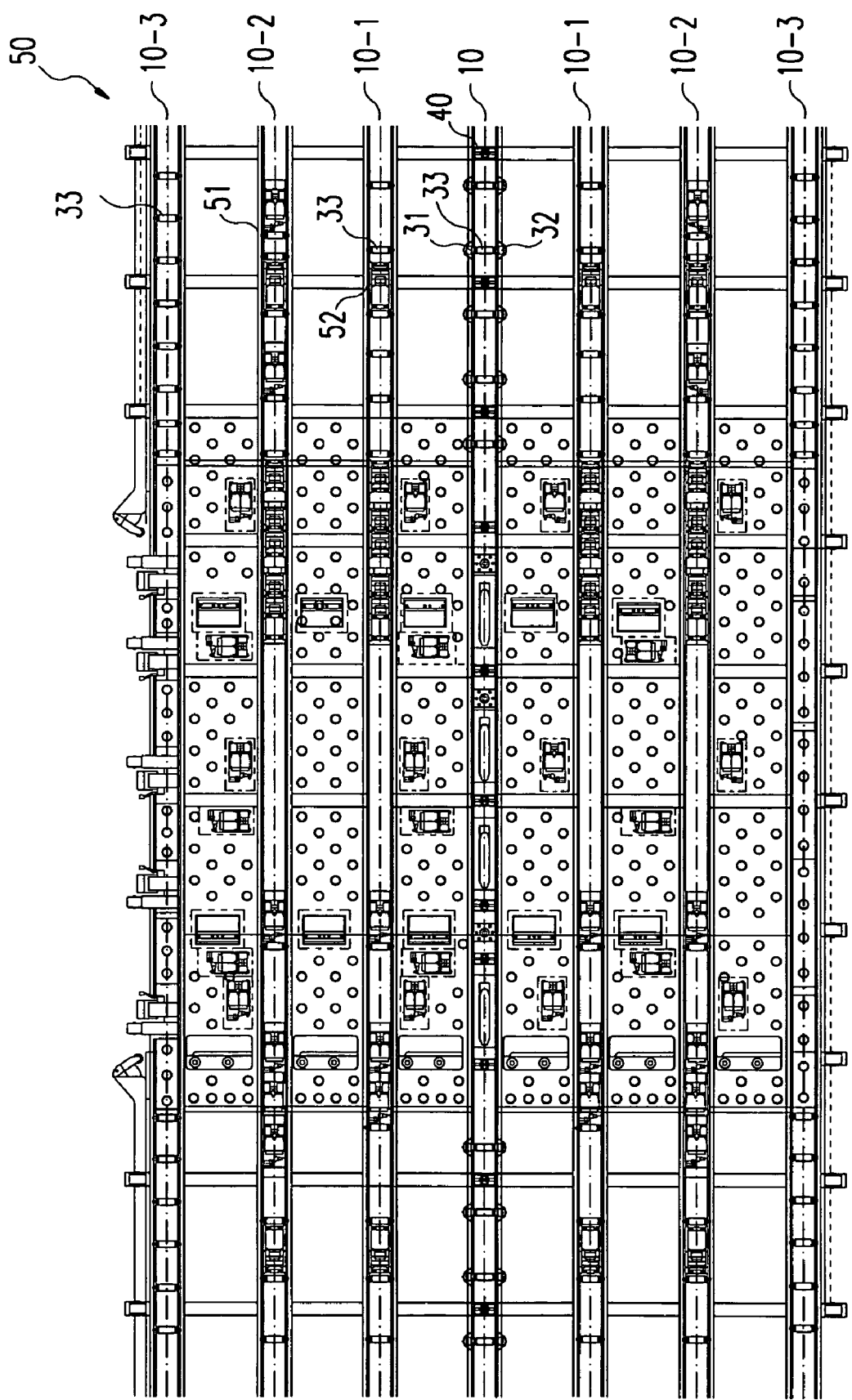
FIG. 5 is a plan view of a section of a floor of a cargo hold.

As shown in FIG. 5, on a cargo-hold floor 50 there are a total of 7 mounting profiles, oriented in the long direction of the aircraft, namely a central mounting profile 10, two mounting profiles 10-3 at the edges, and between center and edge on each side two inner mounting profiles 10-1 and 10-2. In the inner mounting profiles 10-1 and 10-2 are mounted power drive units (PDUs) 51 and latches 52, which secure containers against forces in the long direction of the aircraft. In addition, in all mounting profiles (internal) rollers 33 and ball elements 53 (see FIG. 4) are disposed, so that roller conveyors are produced.

Figure 1:
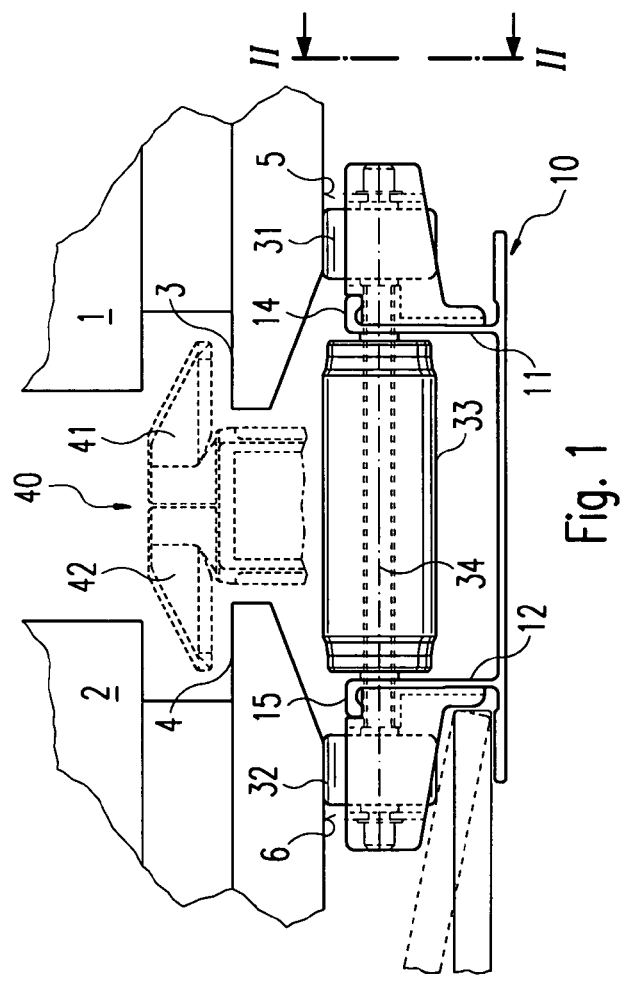
FIG. 1 is a front view of a mounting profile with rollers and wedge-shaped containers.
Figure 3:
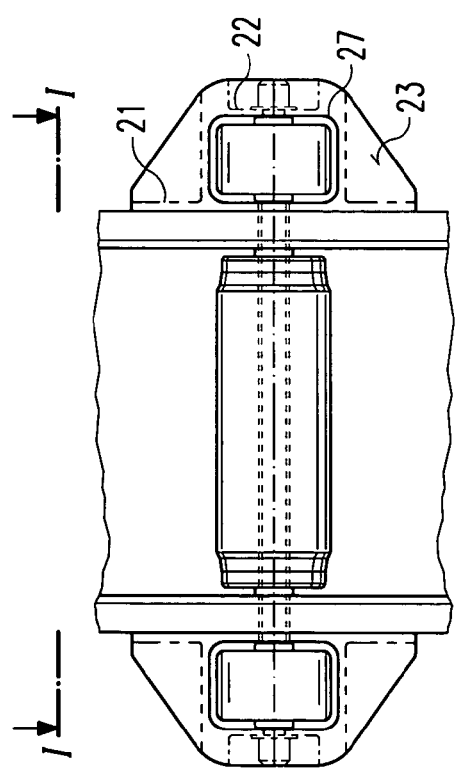
FIG. 3 is a view along the line III-III in FIG. 2.

In the central mounting profile 10, which is provided with the external rollers 31, 32, latches 40 are attached to secure the items of freight in the transverse direction of the aircraft. As indicated in FIG. 1 and FIG. 4, each of these latches 40 comprises lugs 41, 42 that point towards the two sides. By this means containers 1, 2 (see FIG. 1) with locking edges 3, 4 can be secured by means of the latch 40, i.e. its lugs 41, 42. The arrangement of the external rollers 31, 32 is such that the containers 1, 2 with their edge strips 5, 6 are (barely) resting on the external rollers 31, 32, but do not contact the internal roller 33. Thus two containers situated side by side on the cargo-hold floor (see FIG. 4) can be reliably supported by means of a single mounting profile 10 and the external rollers 31, 32 attached there. If a container with greater width is loaded into the cargo hold, or for whatever reasons a narrower container is being transported not along the edges but rather more in the middle, the internal roller 33 comes into action; this roller is wide enough to support such a container even at its relatively soft floor. In this case the external rollers 31, 32 provide an additional supporting surface.

It can be seen from the above that the utilization of the support rollers described here is associated not only with savings in effort and/or weight; in addition, because of the arrangement of the latches 40 within this central mounting profile, a considerable advantage is achieved in comparison to the state of the art.

LIST OF REFERENCE NUMERALS 1 1st container
2 2nd container
3 Locking edge
4 Locking edge
5 Edge strip
6 Edge strip
10 Mounting profile
11 1st side wall
12 2nd side wall
13 Floor
14 Upper edge
15 Upper edge
20 Cage
21 Flange
22 Outer wall
23 Upper surface
24 Side plate
25 Side plate
26 Rivet
27 Opening
31 1st external roller
23 2nd external roller
33 Internal roller
34 Axle
40 Latch
41 1st lug
42 2nd lug
50 Cargo-space floor
51 PDU (power drive unit)
52 Latch
53 Ball element

The invention claimed is:

1. Support roller arrangement comprising:
a mounting profile mounted to a floor of an aircraft cargo hold, the mounting profile comprising side walls defining an interior space wherein latch elements can be mounted in order to secure an item of freight; and
an axle that passes through the side walls of the mounting profile and on each end of which an external roller is rotatably mounted outside the interior space of the mounting profile, wherein
an internal roller is mounted on the axle within the interior space of the mounting profile.

2. Support roller arrangement according to claim 1, wherein
each of the external rollers is mounted in a respective support cage, each support cage having a first side and a second side opposite said first side,
said first side is fastened to an adjacent one of said side walls of the mounting profile, and
said second side comprises an outer wall that supports a respective end of the axle.

3. Support roller arrangement according to claim 2, wherein the support cage defines an upper surface with a central opening through which the external roller mounted therein extends outward.

4. Support roller arrangement according to claim 3, wherein the upper surface of the support cage is constructed so that it slopes upward toward the external roller mounted in said support cage.

5. Support roller arrangement according to claim 3, wherein the upper surface of the support cage has a rounded outer contour with side flanks that diverge in the direction toward the adjacent side wall part of the mounting profile to which the support cage is attached.

6. Support roller arrangement according to claim 1, wherein the length of the external rollers is substantially smaller than the width of the internal space of the mounting profile.

7. Support roller arrangement according to claim 1 when installed in the middle of a cargo hold of an aircraft to operate as a roller conveyor, transverse latch elements being mounted in the internal space of the mounting profile to lock into place pairs of freight items along the middle of the floor of the cargo hold.

8. Support roller arrangement according to claim 2, wherein said fastening of said first side of said support cage to said adjacent one of said side walls of said mounting profile provides essentially all support for said support cage relative to said floor of said aircraft cargo hold.

9. An aircraft cargo hold, comprising:
a floor;
a mounting profile mounted to said floor, said mounting profile comprising a first side wall and a second side wall, said first and second side walls defining an interior space for mountably receiving one or more latch elements for securing an item of freight; and
one or more support roller arrangements, wherein each of said support roller arrangements comprises:
an axle having opposite first and second ends, said axle being configured and adapted to pass through said first and second side walls of said mounting profile such that said first and second ends of said axle are exterior of said interior space of the mounting profile;
a first external roller rotatably mounted on said first end of said axle; and
a second external roller rotatably mounted on a second end of said axle, wherein
each of said support roller arrangements comprises an internal roller rotatably mounted on a portion of said axle situated within said interior space of said mounting profile.

10. The aircraft cargo hold of claim 9, comprising two or more of said support roller arrangements.

11. The aircraft cargo hold of claim 9, wherein, with regard to at least one of said support roller arrangements, said internal roller, said first external roller and said second external roller have equal diameters.

12. A support cage for use with a mounting profile having a side wall along a longitudinal direction of said mounting profile, said mounting profile being configured and adapted for mounting on a floor of an aircraft cargo hold such that said side wall extends perpendicular from said floor, comprising:
a first side configured and adapted for contacting attachment to said side wall of said mounting profile;
a second side opposite said first side;
an upper surface that extends from said first side to said second side, said upper surface having a central opening for receiving a roller; and
supporting elements attached to said first side that support said upper surface and said second side, wherein
said first and second sides are configured and adapted to receive an axle for rotatably supporting, intermediate said first and second sides, said roller for supporting items of freight, and
said upper surface has a rounded outer contour and side flanks that diverge such that a portion of said upper surface proximal to said first side is wider than a portion of said upper surface distal to said first side.

13. The support cage of claim 12, wherein said central opening is configured and adapted such that at least a portion of said roller may extend through said central opening when rotatably supported on said axle.

14. The support cage of claim 12, wherein said upper surface has a first sloped surface and a second sloped surface that are sloped so as to form respective, upward ramps toward said central opening.

15. The support cage of claim 12, wherein said upper surface has a first sloped surface and a second sloped surface that are sloped such that areas of said sloped surfaces distal from said central opening are closer to said floor than areas of said sloped surfaces proximal to said central opening, when said first side is contactingly attached said mounting profile.

16. The support cage of claim 12, wherein said upper surface extends, when said first side is contactingly attached to said mounting profile, in a first direction orthogonal to said side wall of said mounting profile and a second direction parallel to said longitudinal direction of said mounting profile.

17. The support cage of claim 12, wherein said first and second sides are configured and adapted to receive said axle in a direction that extends perpendicular to said longitudinal direction of said mounting profile when said first side is contactingly attached thereto.

18. The support cage of claim 12, wherein said upper surface has a rounded outer contour and side flanks that diverge such that a portion of said upper surface proximal to said first side is wider than a portion of said upper surface distal to said first side.

19. The support cage of claim 12, comprising, at an intersection of said first side and said upper surface, a cutout for receiving an upper outward flange of said side wall of said mounting profile.

20. The support cage of claim 12, wherein said supporting elements have, at a side thereof opposite said upper surface, an edge that slopes toward said upper surface as the distance of said edge from said first side increases.

21. The support cage of claim 12, wherein said supporting elements are two lateral panels that extend perpendicular to said first side and to said upper surface.

22. The support cage of claim 12, wherein said support cage is of a strength suitable to transfer substantially all forces applied thereto from said axle to said side wall of said mounting profile via said attachment of said first side to said side wall of said mounting profile.

23. A mounting profile for use on a floor of an aircraft cargo hold, comprising:
a first side wall and a second side wall, said first and second side walls defining an interior space for mountably receiving one or more latch elements for securing an item of freight, and
one or more support roller arrangements, wherein each of said support roller arrangements comprises:
an axle having opposite first and second ends, said axle being configured and adapted to pass through said first and second side walls such that said first and second ends of said axle are exterior of said interior space;
a first external roller rotatably mounted on said first end of said axle; and
a second external roller rotatably mounted on a second end of said axle,
wherein each of said support roller arrangements comprises an internal roller rotatably mounted on a portion of said axle situated within said interior space, and
wherein, with regard to at least one of said support roller arrangements, said internal roller, said first external roller and said second external roller have equal diameters.

24. The mounting profile of claim 23, comprising two or more of said support roller arrangements.

* * * * *